United States Patent [19]

Hamatani et al.

[11] 4,081,625
[45] Mar. 28, 1978

[54] CONTROL CIRCUITRY FOR KEY TELEPHONE APPARATUS

[75] Inventors: Fumikazu Hamatani; Mikihiro Ichikawa; Yuji Tanaka, all of Kawasaki, Japan

[73] Assignees: Nippon Tsu Shin Kogyo K.K., Kawasaki, Japan; TIE/Communications, Inc., Stamford, Conn.

[21] Appl. No.: 728,514

[22] Filed: Oct. 1, 1976

[30] Foreign Application Priority Data

Feb. 3, 1976  Japan .................................. 51-10492

[51] Int. Cl.² ............................................. H04M 1/72
[52] U.S. Cl. ..................................... 179/99; 179/81 C
[58] Field of Search ..................... 179/81 C, 99, 84 L

[56] References Cited

U.S. PATENT DOCUMENTS

| 3,239,610 | 3/1966 | Morse et al. | 179/99 |
| 3,453,396 | 7/1969 | Lacey et al. | 179/99 |
| 3,739,104 | 6/1973 | O'Neill | 179/99 |
| 3,748,403 | 7/1973 | Schartmann et al. | 179/99 |
| 3,860,763 | 1/1975 | Sudoh et al. | 179/99 |
| 3,902,024 | 8/1975 | Hijikata et al. | 179/99 |

Primary Examiner—Kathleen H. Claffy
Assistant Examiner—Randall P. Myers
Attorney, Agent, or Firm—Kenyon & Kenyon

[57] ABSTRACT

The disclosure is for key telephone system line control circuitry which provides telephone station line status signals for central office ring, busy, idle and station hold conditions by means of a single control line.

8 Claims, 3 Drawing Figures

CONTROL CIRCUITRY FOR KEY TELEPHONE APPARATUS

BACKGROUND OF THE INVENTION

1. Field of the Invention

The present invention relates to key telephone apparatus, and in particular it relates to a key telephone central office line circuit which reduces the number of connecting leads required for signalling between the line circuit and the associated telephone station sets. Still more particularly, the invention relates to control circuitry for each central office line using a total of only three leads: two talking lines and one control line. The control circuitry is used in common for all telephone sets connected to the associated central office line and performs such functions as incoming call detection, hold detection, and automatic hold release in response to central office line disconnection.

2. Description of Prior Art

In prior art key telephone apparatus, the control of each central office line connected to a plurality of key telephone station sets was performed with four leads: two talking leads, one control lead and one lamp lead. Each central office line required these four leads and as the number of central office lines contained in a key telephone system increased, the number of leads used increased accordingly. This increased manufacturing costs and was unsightly in appearance.

In recent years the telephone equipment market has experienced a very strong demand for natural resource convervation, cost reduction, functional improvement and better appearance. Consequently, the present invention was created in a key telephone apparatus market atmosphere that called for the removal of the deficiencies present in prior art key telephone apparatus. It is therefore an object of this invention to provide a new key telephone system line circuit which would achieve the same functions as prior art key telephone line circuits with only three conductors per central office line instead of four.

It is a further object of this invention to provide a key telephone line circuit which lowers the cost of the control circuitry by combining the circuits for the central office line incoming call detection function and the hold detection function.

It is also an object of this invention to provide an economical automatic hold release function under control of the central office line by combining the circuits for the central office line incoming call detection function and the hold function.

SUMMARY OF THE INVENTION

The present invention is for central office (hereinafter also referred to as "CO") line control in a key telephone system apparatus. A key telephone system generally has a main apparatus having one central office line circuit for each central office ("CO") line, talking leads and control leads connecting each of the several central office line circuits, to a plurality of key telephone sets. Each key telephone set has a plurality of indicators, each one corresponding to a CO line, a hook switch, a switch means for selecting each office line, and a switch means for holding a selected office line. In a key telephone system, incoming call, talking, holding and idle conditions on the CO lines are controlled and indicated by sending and receiving control signals between the central office line circuits and the key telephone sets through the control leads. This invention is for a key telephone system in which only a single control lead is furnished from each central office line circuit to the key telephone sets. A central office line indicator driver circuit corresponding to this single control lead is furnished at each telephone set. Each central office line circuit has an indicator-driver control circuit which responds to an incoming central office call by sending an indicator signal on the control lead to the key telephone sets. Each key telephone set connected to the central office line has a circuit which generates a signal on the single control lead when the central office line selection switch means and the hook switch are operated by the telephone set user.

The central office line control circuits have a first detection circuit which detects current flowing in the central office line (a) on the occurrence of incoming calls, (b) when a key telephone set is connected to the central office line and the set is in the "talk" mode and (c) when the key telephone set is in the "hold" mode. A second detection circuit is provided in the central office line control circuits which detects the existence of the output signal from the signal generation circuit of any of the key telephone sets on the corresponding control lead. Also provided in the control circuits is a first means of sending a first output signal onto the single control lead when the first detection circuit detects that an incoming call is on the central office line and when the second detection circuit detects no telephone generated signal on the control lead. The first output signal operates the indicator driver circuit in each telephone station set.

Means are provided for generating a second output signal via the indicator driver control circuit onto the single control lead when the first detection circuit detects that the telephone set talking circuit remains connected and the second detection circuit detects that the telephone generated signal on the control lead has ceased (i.e., the telephone set is initiating the hold state).

Also in this key telephone apparatus, the output of the indicator driver control circuit is applied by the CO line circuit to the control lead as a first d.c. voltage. On the other hand, the output signal of the signal generation circuit of the key telephone set is sent out as a second d.c. voltage (later referred to as a ground, but actually is a few diode drops below) that differs from the first d.c. voltage. The second detection circuit detects the second d.c. voltage only and generates an output signal in response thereto.

Following the present invention, it is possible to control and signal the status of a CO line with only one control lead and in the case of disconnection of a held CO line initiated by the CO, the idle condition is restored automatically because the first detection circuit ceases to generate an output. Since the first and second detection circuits are used in two or more ways for incoming call detection, supervising the talking condition, and initiating and supervising holding, there is the advantage of simplified circuit construction while maintaining desired control functions.

BRIEF DESCRIPTION OF THE DRAWINGS

This invention, as well as its objects and features, will be better understood by reference to the following detailed description of the preferred embodiment of this invention taken in conjunction with the accompanying drawings in which.

DESCRIPTION OF THE INVENTION

Figure 1:
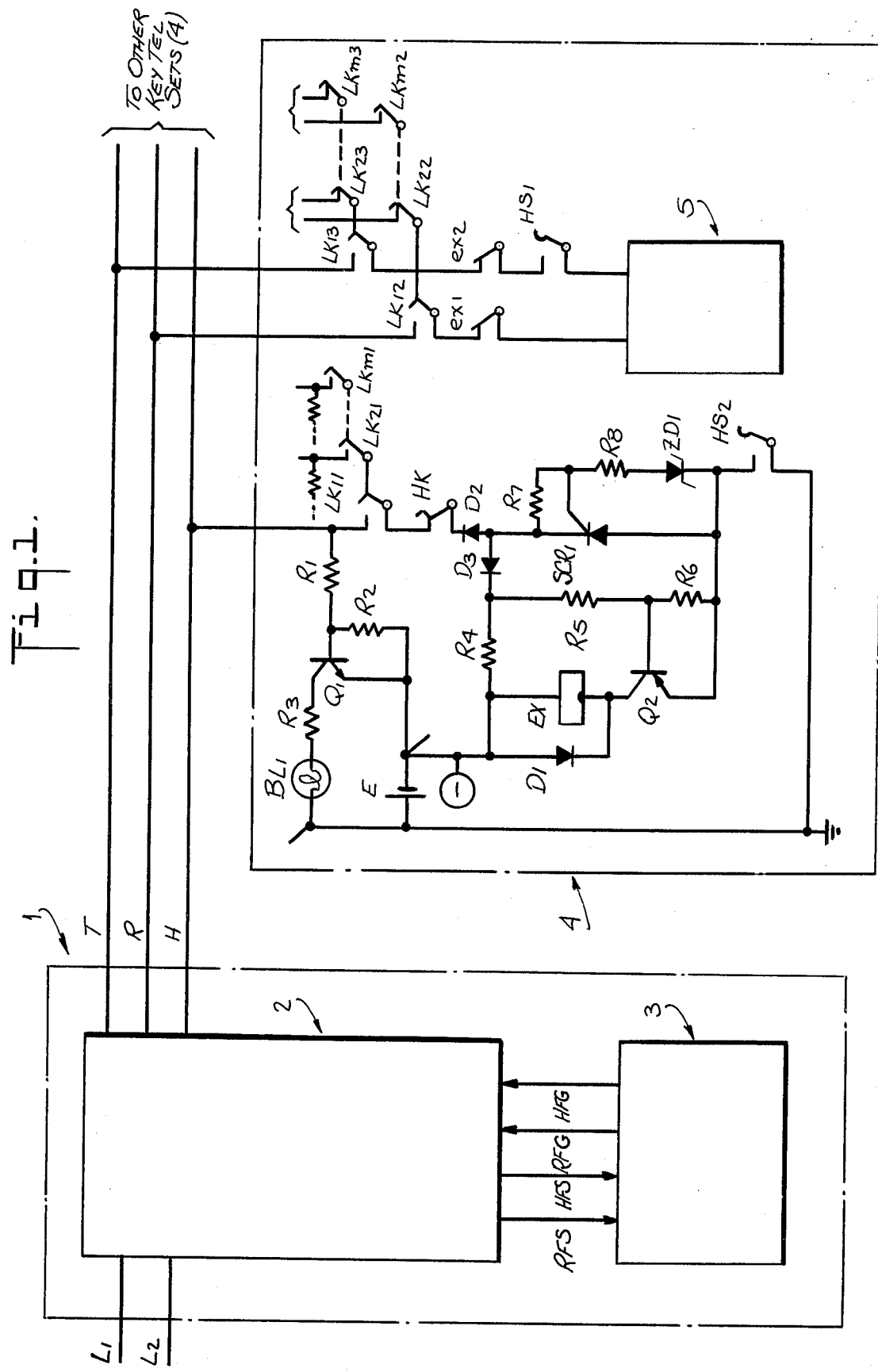
FIG. 1 is a complete circuit drawing of the key telephone control circuit system according to the invention, including control circuitry located at each key telephone station set in the system.

In FIG. 1, a key telephone system is shown. Similar to prior art key telephone systems, the invention contains a main apparatus 1 having plural central office line circuits 2 connected respectively to plural central office lines and plural telephone sets 4 by means of two talking leads T and R and a control lead H associated with each single central office line circuit 2. However, in the drawings, for the sake of simplification, only one CO line, one CO line circuit and one telephone set are shown.

Also, main apparatus 1, in the same manner as prior art apparatus, contains intercom line circuits, and the plural telephone sets corresponding thereto are connected to the intercom lines. However, intercom line circuits are outside the scope of the present invention, and since they bear no direct relation to the present invention, all explanations relative to them will hereafter be omitted.

Figure 2:
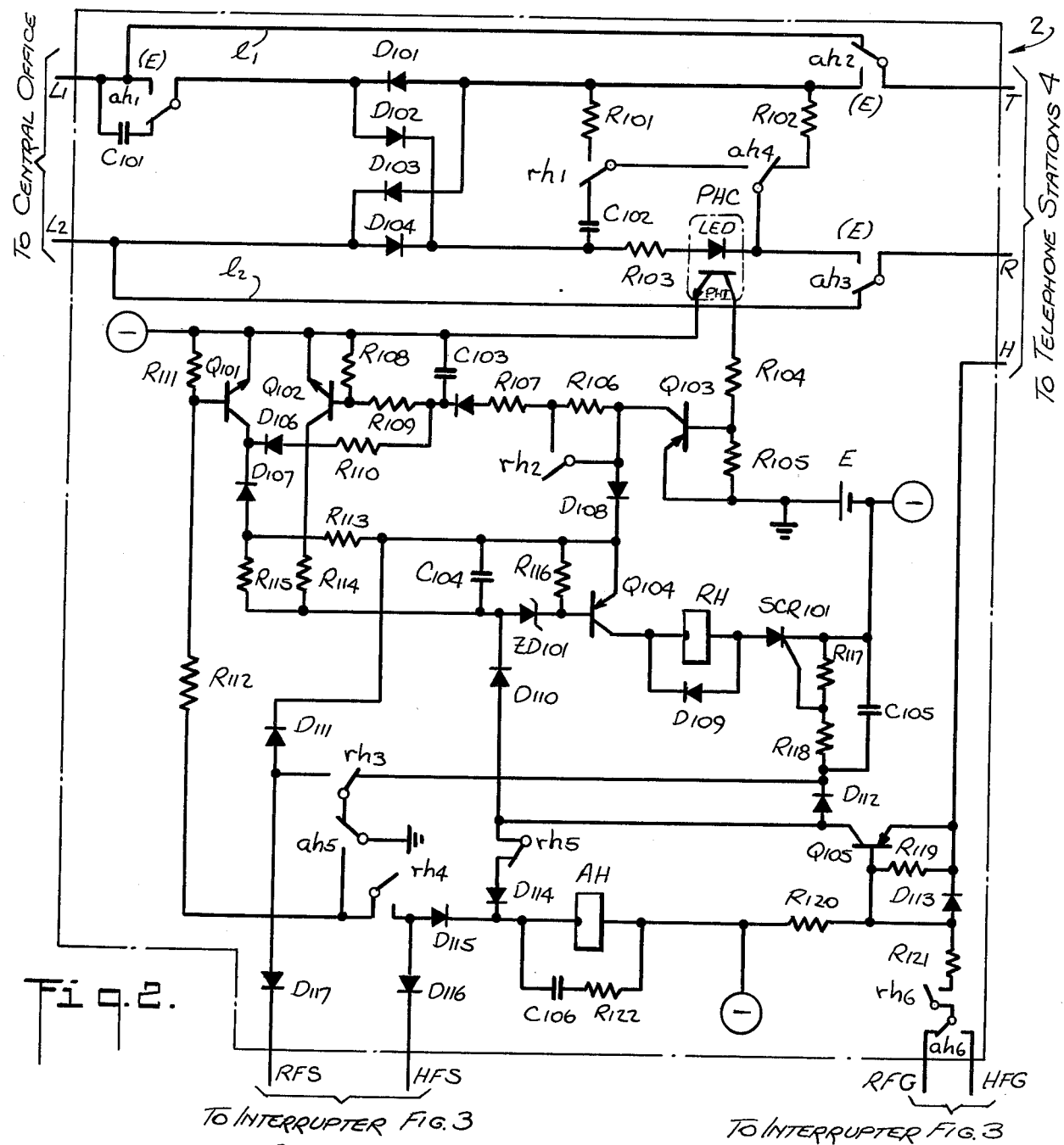
FIG. 2 is an electrical schematic diagram of the CO line circuit associated with each central office line according to the invention, wherein the CO line circuit shown in FIG. 2 is indicated as a block labeled "2" in FIG. 1.
Figure 3:
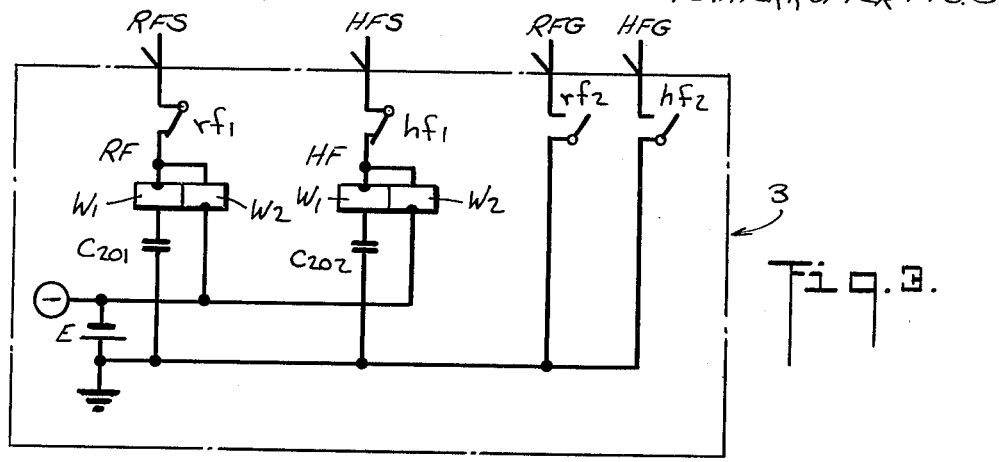
FIG. 3 is an electrical signal generator schematic of an interrupter circuit according to the invention, wherein the circuit shown in FIG. 3 is indicated as a block labeled "3" in FIG. 1.

Referring to FIG. 1, the present invention differs from prior art circuits in the construction of central office line circuit 2 and the construction of the control circuits in each telephone set 4, in that only one control lead H is used in each central office line circuit, and in that control can be achieved between central office line circuit 2 and telephone 4 with only one control lead H. Each main apparatus comprises plural central office line circuits 2 and an interrupter circuit 3 which supplies interrupted signals from output terminals RFG and HFG in response to control signals from central office line circuit 2 terminals RFS and HFS. Examples of central office line circuit 2 and interrupter circuit 3 are shown in FIG. 2 and FIG. 3 and will be described below.

Again referring to FIG. 1, each telephone set 4 has a talking or hybrid network 5. The talking network 5 is connected to talking leads T and R of each central office line circuit 2 via contact HS1 of hook switch HS (not illustrated), break contacts $ex_1$, $ex_2$, of exclusion relay EX, and contacts $LK_{12}$, $LK_{13}$, $LK_{22}$, $LK_{23}$, . . . , and $LK_{m2}$ and $LK_{m3}$ of each central office line selection key $LK_1$, . . . $LK_m$ (keys are not illustrated in the drawings but are assumed to be conventional mechanically interlocking key switches well known in the art). For purposes of illustration, FIG. 1 shows only the case where connection can be made to one pair of talking leads T and R via contacts $LK_{12}$ and $LK_{13}$ of key $LK_1$.

Telephone set 4 also has a quantity m of indicators (such as lamps, LEDS, etc., hereinafter referred to as "lamps") each indicator or lamp being furnished with an indicator driver circuit which supplies current to drive the lamp. Each indicator drive circuit is connected to the control lead of a corresponding central office line circuit.

Telephone set 4 (FIG. 1) shows a single lamp $BL_1$ and its circuit comprising NPN transistor Q1 and resistors R1, R2 and R3 which serve as the lamp driver circuit. Since the other lamps $BL_2$ . . . , $BL_m$ and their drive circuits are identical, the illustrations for them have been abbreviated by indicating only the resistors corresponding to resistor R1. Lamps $BL_2$, . . . , $BL_m$ and their driver circuits are connected in a circuit to each pole of d.c. power source E, in the same manner as for the illustrated lamp $BL_1$ and its driver circuit. Power source E has its positive pole connected to ground potential.

In order to generate a response signal, silicon controlled rectifier SCR1 is connected to ground via contact $HS_2$ of hook switch HS, and is connected to the selected control lead H of the central office line circuit via diode D2, contact HK of a holding key (not illustrated) and contacts $LK_{11}$ to $LK_{m1}$ of each central office line selection key LK1 to LKm. The drawings show only contact $LK_{11}$ of key LK1 and the connection to the control lead H corresponding thereto. Contacts $LK_{21}$ to $LK_{m1}$ of the other keys and the connections of their corresponding control leads are omitted, contacts $LK_{21}$ and $LK_{m1}$ being shown only in part. Although only one complete circuit is illustrated in FIG. 1, the connection of SCR1 to the corresponding control leads via each contact $LK_{21}$ to $LK_{m1}$ should be apparent. Also, when the hold key is operated, contact HK is opened, and when the hold key is subsequently released, the previously operated central office line key $LK_1$ to $LK_m$ moves and is released, opening contacts $LK_{11}$, $LK_{12}$, $LK_{13}$ . . . $LK_{m1}$, $LK_{m2}$, $LK_{m3}$.

Telephone set 4, in order to have an exclusion function, is provided with exclusion relay EX with a circuit comprising PNP transistor Q2 and resistors R4, R5 and R6 as its drive circuit. This drive circuit is connected to each particular control line H via contact HK of the hold key and contacts $LK_{11}$ to $LK_{m1}$ of the central office line selection keys. It should be understood that the CO line circuit of present invention will function in the same manner with key telephone sets not provided with an exclusion circuit such as is herein described. It is not intended that the scope of the present invention be limited to key systems with exclusion circuits.

Diode D1 is for protection of exclusion relay EX driver transistor Q2, diode D2 is to prevent reverse current, diode D3 prevents current flow through the emitter-base junction of Q2 and resistor R5 to the transistor Q1, resistors R7 and R8 are gate bias resistors of silicon controlled rectifier SCR1, and Zener diode ZD1 is for signal threshold control. Resistor R4 provides SCR1 with a conduction path once it is in a conducting state.

The circuit of FIG. 1 is further explained by tracing its operation when a central office call arrives on lines $L_1$ and $L_2$.

When an incoming call signal arrives on central office lines L1 and L2, CO line circuit 2 detects it, and sends a control signal via output terminal RFS to interrupter circuit 3. In response, interrupter circuit 3 generates a first periodically interrupted signal on output lead RFG.

The first interrupted signal is applied by line circuit 2 onto control lead H and periodically drives transistors Q1 of each of the multiple key telephone sets 4 connected to the central office line to flash its corresponding lamp $BL_1$. This interrupted signal is preferably a square wave signal, the approximate levels of which vary between E volts below ground at the lower level (e.g. the voltage of the power source) and a few volts negative with respect to ground at the higher level. (The generation of this signal will be explained below). During the higher level of the interrupted signal, the voltage on lead H and hence the base of Q1 is positive with respect to the emitter of Q1. Thus, Q1 is turned on and lamps BL are lighted. During the lower levels of the signal on lead H, Q1 does not conduct and lamps BL turn off. An audible ring is generated by line circuit 2 at each key telephone set 4 by the incoming call signal's arrival to announce the incoming call, but since this is not within the scope of the present invention and is well known in prior art key telephone apparatus, it will be omitted from further explanation.

When key LK1 in key telephone set 4 is depressed in response to the flashing of lamp $BL_1$ and hook switch HS is operated, contacts $LK_{11}$, $LK_{12}$, $LK_{13}$, $HS_1$ and $HS_2$ are closed, and a ground potential is applied to the cathode of Zener diode ZD1. The first interrupted or square wave is applied to the anode of Zener diode ZD1 through D2, R7 and R8. During the lower level of the square wave signal, approximately E volts below ground is applied across Zener-diode ZD1 which breaks down and a gate current flows to silicon controlled rectifier SCR1. The conduction of SCR1 supplies a ground potential to control lead H via contact HK of the hold key, diode D2, and contact $LK_{11}$ of key $LK_1$. The ground signal on lead H is thus a response signal to the closing of line key $LK_1$ and the hook switch.

Because of this ground potential appearing on lead H, transistor Q1 conducts steadily and lights lamp $BL_1$ steadily. Central office line circuit 2, in response to the ground potential on lead H enters the answer condition, whereby CO line leads L1 and L2 are connected to talking lines T and R, via office line circuit 2, and are then connected via key contacts $LK_{12}$ and $LK_{13}$ of key $LK_1$, contacts $ex_1$ and $ex_2$ of relay EX, and contact $HS_1$ of the hook switch to talking network 5, this establishing the talking condition.

If a second attempt is made by a second key telephone set to connect to the central office line connected to the first key telephone set 4 while it is in this talking condition, the approximate ground potential (voltage drops across D2 and SCR1 are small) on control lead H being supplied by first key telephone set 4 during talking, would be applied to the anode of the Zener diode ZD1 in the second key telephone set. Thus the Zener diode ZD1 of the second telephone set would have both its anode and cathode at approximate ground potential and would thus be nonconducting. Consequently SCR1 of the second telephone set would not be gated and, receiving base current via R4 and R5, transistor Q2 of the second telephone set would conduct and operate its exclusion relay EX, and this would cause its relay contacts $ex_1$ and $ex_2$ to open. Thus the second key telephone set would enter an exclusion condition. On the other hand, when the hold key is pushed in the first key telephone set 4 that is in the takling condition, its contact HK opens, so that the ground potential applied onto control lead H is removed. The SCR1 is first telephone set 4 continues to conduct because of current flow through R4. Thus exclusion relay EX of telephone set 4 does not operate, and talking network 5 continues in the state where it is connected to talking lines T and R and consequently to office lines L1 and L2.

If telephone set 4 is in the talking condition, where talking network 5 is connected to talking leads T and R, removal of the ground potential from control lead H causes central office line circuit 2 to enter a hold cetection mode, and central office line L1 and L2 to enter a hold condition. In this hold condition, when the hold key of telephone set 4 is released, central office line selection key $LK_1$ also releases, but central office line circuit 2 continues in the hold condition. When office line circuit 2 is in the hold condition, a control signal is applied on output terminal HFS and drives interrupter circuit 3, which supplies a second interrupted signal on output terminal HFG. This second interrupted signal, in the same manner as the first interrupted signal, is applied by central office line circuit 2 to control lead H and drives transistor Q1 of the lamp driver circuit of each key telephone set, shown as telepnone set 4 in the drawings. The d.c. potentials of this second interrupted signal on control lead H are the same as those of the first interrupted signal that appears at the time of an incoming CO call as described above. The second interrupted signal causes lamp $BL_1$ to flash at the frequency of the second interrupted signal. In this hold state, if a second response is made to access the central office line by pushing key $LK_1$ in key telephone set 4, a ground potential is supplied from key telephone set 4 to control lead H by the same operation as in the response to an incoming CO call described above, and CO line circuit 2 again enters the talking condition. That is, key telephone set 4 is connected via central office line circuit 2 to central office line leads L1 and L2. If hook switch, contacts $HS_1$ and $HS_2$ open during the talking condition, an idle or cleared condition is entered.

Next, the operation of the central office line circuit 2 will be explained by reference to FIG. 2. Central office line circuit 2 includes central office line leads L1 and L2, a full-wave bridge rectifier circuit comprising diodes D101, D102, D103, D104 interposed between talking lines T and R, central office line holding resistor E101 on the output side of the rectifier circuit, a central office line incoming call (hereafter ringing) current limiting resistor R10, and a photocoupler PHC for central office line current detection. Photocoupler PHC comprises a light emitting diode LED and a photo-transistor PHT. When current flows in the LED, photo-transistor PHT is turned on and provides a conduction path between its emitter and collector.

Central office line ringing current limiting resistor R102 is connected to the output of the rectifier circuit via contact ah4 of relay AH, (relay AH will be described below) and completes a circuit to the LED of photocoupler PHC. The central office line hold resistor R101, is connected across the output of the rectifier circuit via normally open relay contacts ah4 and rh1, and completes a circuit to photocoupler PHC during the central office line hold condition in which relays AH and RH, to be described later are operated.

Contack ah1 of relay AH, and capacitor C101, are interposed on the input side of the rectifier circuit so that direct current from the central office line is blocked by capacitor C101 when contact ah1 is in the non-operated position shown in FIG. 2. Only alternating current signals across central office line $L_1$ and L2 can pass through capacitor C101. Of course, a.c. and d.c. signals on the central office line are applied to the rectifier circuit via normally open contact ah1 when relay AH operates.

When relay AH is not operated, central office line leads L1 and L2 are connected to talking leads T and R via normally closed contacts ah2 and ah3 and leads L1 and L2. Capacitor C102 is used as an audio signal bypass when AH is operated during talking.

Phototransistor PHT of photocoupler PHC is connected to the positive pole of d.c. power source E via resistors R104 and R105. When the photo-transistor PHT is energized by current flowing through light emitting diode LED, current flows through resistors R104, R105 and the base of transistor Q103, turning Q103 on. The positive pole of power source E is established as system ground potential.

Transistor Q103, a PNP transistor, has its emitter connected to the positive pole of cell E. Series connected resistors R106 and R107, diode D105 and capacitor C103 are connected to its collector, and capacitor C103 is connected to the negative pole of power source E. Consequently, transistor Q103 charges capacitor C103 when it is conducting. Also, resistor R108 and R109 are discharge resistors for capacitor C103 as well as bias resistors for transistor Q102.

Transistor Q102, an NPN transistor, has its emitter and base connected to both terminal potentials of capacitor C103, and discharging current from capacitor C103 passes through it.

The collector of transistor Q102 is connected to the base of transistor Q104 via resistor R114 and Zener diode ZD101. The emitter of transistor Q104, a PNP transistor, is connected to the collector of transistor Q103 via diode D108. Also, between the emitter and base of transistor Q104, resistor R116 and capacitor C104 are in parallel with resistors R113 and R115. Consequently, when transistors Q103 and Q102 are turned on, transistor Q104 is turned on. Also, capacitor C104 is provided as shown in FIG. 2 in order to relay the conduction of transistor Q104 in order to prevent the establishing of a hold condition at the time of disconnection, and resistors R113 and R115 are its discharge resistances.

The collector of transistor Q104 is connected to the the coil of relay RH. The opposite relay RH coil terminal is connected to the anode of silicon controlled rectifier SCR101, and the cathode of SCR101 is connected to the negative pole of power source E.

In the gate circuit of SCR101, bias current flows in resistors R117 and R118 via break contacts rh3 and ah5 when relays RH and AH are not operated so that a gate signal is applied to SCR101 when relays AH and RH are both released. Diode D109 is for protection against surge voltages generated by relay RH. Capacitor C105 is for maintaining bias current in SCR101. During the condition wherein relay RH is operated, and relay AH is not operated, a path is established from ground via break contact ah5, make contact rh3, and diode D111 to the emitter of Q104. Thus, an alternate path from ground to the emitter of Q104 is provided to establish a holding path for relay RH independent of Q103. A ground signal is also provided via diode D117 to output terminal RFS. Diodes D111 and D117 are supplied for preventing reverse currents.

Control lead H is connected to output terminals RFG and HFG of interrupter circuit 3 via diode D113, resistor R121, contact rh6 that cloes when relay RH operates, and transfer contact ah6 of relay AH. Transistor Q105 and diode D113 form a current direction sensing circuit diode, D113 providing a current path, in one direction, transistor Q105 emitter - base junction providing a current path in the other direction. When relay AH is not operated, contact *ah6* connects to output terminal RFG; when relay AH operates, it connects to output terminal HFG.

When relay contact rh6 is closed, and an interrupted ground signal is applied on either RFG or HFG signal leads, a square wave signal appears at the anode of diode D113, the signal varying between E volts below ground at the lower level (when ground is removed on RFG or HFG) and a few volts negative with respect to ground at the higher level (when ground is present on RFG or HFG). The higher level is a few volts below ground because of the voltage divider formed by resistors R120 and R121.

Control lead H is also connected to the emitter of transistor Q105, a PNP transistor. Since control lead H is connected to the base of Q105 via resistor R119, when a ground potential is applied from telephone set 4 on control line H, transistor Q105 conducts. Resistor 120 is a bias resistor and is connected to the negative pole of power source E. The collector of transistor Q105 is connected via diode D110 to the anode of Zener diode ZD101 which connects to the base of transistor Q104. The collector of Q105 is also connected to capacitor C105 via diode D112. Consequently, when transistor Q105 conducts, the voltage across Zener diode ZD101 falls below its zener voltage causing transistor Q104 to cut off, and capacitor C105 to charge.

The collector of transistor A105 is also connected to relay AH via reverse current blocking diode D114 and break contact rh5 which is closed as shown in FIG. 2 when relay RH is not operated. Relay AH is further connected to the negative pole of power source E. As a result, when transistor Q105 conducts, and when relay RH is not operated, relay AH operates. Further, capacitor C106 and resistor R122 comprise s charging and discharging circuit for delaying the release of relay AH.

Make contact ah5, which closes when relay AH operates, creates a path to ground for the base of transistor Q101, an NPN transistor, via resistor R112. The base of transistor Q101 via resistor R111 and the emitter of transistor Q101 are both connected to the negative pole of power source E, so that when relay AH operates, transistor Q101 conducts, and as a result, capacitor C103 discharges via diode D106 and resistor R110.

Also, make contact ah5 which closes when relay AH operates, provides a ground to output terminal HFS of office line circuit 2 via make contact rh4, which closes when relay RH is energized, and via diode D116. At the same time, it provides a ground to relay coil AH via diode D115. As a result, while relays AH and RH are both energized, a ground potential is applied to output terminal HFS and interrupter circuit 3 is caused to operate. Relay AH is self-held by means of make contact ah5. Diodes D115 and D116 are provided for reverse current prevention. Contacts, ah1, ah2, ah3, and ah4, ah5 and ah6 are all operated by the energization of relay AH.

FIG. 3 shows a preferred embodiment of interrupter circuit 3. This circuit has two input terminals respectively connected to output terminals RFS and HFS of each CO line circuit 2, and two output terminals connected to input terminals of RFG and HFG each CO line circuit.

Input terminal RFS is connected in series via its break contact rf1 to the terminal on one side of both windings of two winding relay RF. Capacitor C201 and power source E are connected in series between the terminals on the other side of the two windings.

Also, input terminal HFS is connected in the same manner in series via its break contact hf1 to the terminal on one side of both windings of two winding relay HF. Capacitor C202 and power source E are connected in series between the terminals on the other side of both windings.

Further, both windings W1 and W2 of both relays RF and HF are connected so as to have oposing fluxes of equal magnitude. The positive pole of power source E is connected via make contact rf2 of relay RF to output terminal RFG and is connected via make contact hf2 of relay HF to output terminal HFG. Further, power source E has its positive pole at ground potential. In this interrupter circuit 3, capacitors C201 and C202 are ordinarily fully charged by power source E via the two windings W1 and W2 of relays RF and HF.

When a ground potential is placed on terminal RFS, capacitor C201 is discharged via ground at contact rf1 through delay RF winding W1, and back to ground, the discharge current flowing through winding W1. Since current flows from power source E via ground to contact rf1 and thence to winding W2, and since windings W1 and W2 have opposing fluxes, relay Rf does not operate.

When the discharge of capacitor C201 is completed, the current passing through winding W1 ceases, and only the current passing through winding W2 remains. Relay RF operates, its contact rf1 opens, and contact rf2 closes.

When relay contact rf1 opens, capacitor C201 begins charging via winding W1 and W2 from power source E. By means of this charging current, relay RF remains operated since the current in winding W1 is now reversed and the fluxes are additive. When the charging of capacitor C201 is completed, the charging current flowing in windings W1 and W2 ceases, and as a result, relay RF releases, contact rf1 closes, and contact rf2 opens. When contact rf1 has closed, if a ground potential continues to appear on terminal RFS, relay RF reoperates by the same sequence described before. As long as a ground potential appears on terminal RFS, relay Rf repeats the operate-release sequence and contact rf2 closes and opens periodically. As a result, an interrupted ground potential signal appears on terminal RFG. The period of this interrupted signal is determined by the charge and discharge time constant of capacitor C201 in combination with the resistances of the RF relay windings.

When a ground potential appears on terminal HFS, since the circuit construction of relay HF, capacitor C202 and power source E is entirely the same as the circuit construction of relay RF, capacitor C201 and power source E described above, relay HF repeats the operate-release sequence in the same way as with the operation of relay RF. Contact hf2 is periodically opened and closed, and an interrupted ground potential signal appears on terminal HFG.

A detailed explanation follows for the operation of the central office line circuit of FIG. 2, with reference to the previous explanation of the operation according to FIG. 1 and the explanation of the operation of the interrupter circuit in FIG. 3.

Incoming Call Detection

Referring to FIG. 2, the central office line circuit 2 in the idle state does not respond to d.c. potential appearing on central office line leads L1 and L2, because it is connected via break contact ah1 and capacitor C101. Alternating current ringing signals are of course transmitted through capacitor C101. In this idle state, when an incoming call signal arrives on office lines L1 and L2, since the incoming call ringing signal is an alternating current (generally 20 Hz), it is supplied to the rectifier circuit via capacitor C101 and break contact ah1, where it is rectified, and via resistor R102 and break contact ah4, the rectified alternating current flows as direct current through light emitting diode LED of photocoupler PHC and illuminates it. In response to the illuminator, photo-transistor light receptor PHT conducts, causing base current to flow in transistor Q103 which conducts.

When transistor Q103 conducts, capacitor C103 is charged via resistors R106 and R107 and diode D105. When capacitor C103 is charged, base current flows in transistor Q102 which conducts. When transistor Q102 conducts, a current flows into the collector of transistor Q102 from the base of transistor Q104 via resistor R114 and Zener diode ZD101 turning transistor Q104 on. Since a gate current is also suppied to silicon controlled rectifier SCR101 through break contacts ah5 and rh3 and resistor R118, when transistor Q104 conducts, SCR101 also conducts, and relay RH operates. When relay RH operates, resistor R106 is shorted by make contact rh2, and capacitor C103 is rapidly fully charged.

Since the ringing signal on the CO line is sent periodically as is well known, transistor Q103 will be nonconducting during the silent interval between applications of the ringing signal, but transistor Q102 will continue conducting because of the discharge current from capacitor C103 when Q103 is cut off.

Even though Q103 is off and ground is not present at its collector, a ground potential supplied to the emitter of transistor Q104 by diode D111, make contact rh3 and break contact ah5, keeps relay RH operated.

Transmission of An Incoming Call Display Signal

Also, a ground potential signal is supplied on output terminal RFS via break contact ah5 and make contact rh3 and diode D117 by the operation of relay RH. As a result, as explained above in describing the circuit of FIG. 3, an interrupted ground signal is applied onto output terminal RFG of interrupter circuit 3. This interrupted ground signal passes through break contact ah6 and make contact rh6. As previously explained, a square wave signal results from the voltage division of power source E across resistors R120 and R121. This first square wave interrupted control signal passes through diode D113 and is sent out on control lead H.

Transmission Of Response Signal by Telephone User When Answering Incoming Call

Because of this first square wave signal, as previously explained in describing the circuit of FIG. 1, lamp BL1 of key telephone set 4 flashes. When a response is made at the key telephone set during this condition, as explained previously, a signal at approximately ground potential is applied to control lead H as a response signal. This response signal is detected by transistor Q105. That is, transistor Q105 is turned on because the ground applied on the control lead H makes its emitter positive with respect to its base, forward biasing Q105.

Response Of Control Circuit To Control Lead Signal In Talking Mode

When transistor Q105 conducts, the ground potential of control line H minus the voltage drops across Q105 and diode D110 is applied to the anode of Zener diode ZD101, and transistor Q104 is turned off. Even if the ground potential applied to the anode of Zener ZD101 should be slightly negative due to voltage drops in semiconductor elements, transistor Q104 will be turned off because of the threshold set by Zener diode ZD101.

When transistor Q104 cuts off, SCR101 also becomes nonconducting, and relay RH releases. When relay RH releases, the ground potential at terminal RFS is removed by normally open contact rh3 and the interrupted ground signal at terminal RFG is removed from control lead H by normally open contact rh6. Subsequently, the interrupted ground signal is removed from terminal RFG of interrupter circuit 3. Further, relay AH is energized by the ground potential of conrol lead H passing through transistor Q105, normally closed contact rh5 and diode D114.

When relay AH operates, transistor Q101 is turned on because of the path from ground via make contact ah5 and resistor R112. With transistor Q101 on, capacitor C103 discharges rapidly via resistor R110, diode D106 and transistor Q101, and transistor Q102 becomes cut off. Also, when relay AH operates, office line leads L1 and L2 are connected to talking leads T and R via make contacts ah1, ah2 and ah3, the rectifier circuit comprising diodes D101, D102, D103 and D104, resistor R103, light emitting diode LED of photocoupler PHC, and capacitor C102, so that key telephone set 4 is connected to the CO line and a talking circuit is achieved.

Connected Telephone Goes on "Hold"

In this talking state, when the hold key in telephone set 4 (FIG. 1) is operated, the ground potential sent to control lead H as a response signal ceases, and relay AH has its release delayed by the discharge of capacitor C106. Also, since capacitor C105 is charged via transistor Q105 and diode D112 in the talking state, a trigger current continues to be supplied to silicon controlled rectifier SCR101 by the discharge of capacitor C105. The ground applied to the anode of Zener diode ZD101 from control line H via Q105 ceases.

In this state, since a d.c. current from the central office line is flowing through the light emitting diode LED of photocoupler PHC, as previously explained, the photo-transistor PHT conducts, and transistor Q103 is on. Also as explained before, since transistor Q101 conducts because relay AH is operated, a base current flows to transistor Q104 via Zener diode ZD101, resistor R115, diode D107 and transistor Q101, and transistor Q104 conducts. Since the conduction of transistor Q104 begins within the time that Scr101 remains triggered by the discharge current of capacitor C105, SCR101 conducts, and relay RH operates. The operation of relay RH occurs within the release delay time of relay AH established by the discharge of capacitor C106.

The operation of relay RH applies a ground potential to relay AH via make contacts ah5 and rh4 and diode D115, and relay AH remains operated during the "Hold" condition of telephone set 4.

Further, the circuit comprising rectifier diodes D101, D102, D103 and D104, make contacts ah1, ah4 and rh1, resistors R101 and R103, and light emitting diode LED of photocoupler PHC is completed across CO line leads $L_1$ and $L_2$ by operation of relay RH. When key telephone set 4 is cut off by releasing the hold key at this point, breaking the talking circuit, current will continue to flow in the LED in response to the d.c. voltage on central office line L1 and L2, relays RH and AH will remain operated and the CO connection will be held by this current.

Transmission of a "Hold" Signal To Telephone Set Indicator

As a result of the operation of relays AH and RH, a ground potential is applied to terminal HFS via make contacts ah5 and rh4 and diode D116. As explained earlier in describing the interrupter circuit of FIG. 3, a second interrupted ground signal is supplied from interrupter circuit output terminal HFG. The interrupted ground is divided to a negative potential by resistors R120 and R121, the same as during the incoming call, and is applied to control lead H via diode D113. By means of this second interrupted signal, as explained earlier with respect to the explanation of the circuit of FIG. 1, lamp BL1 of key telephone set 4 is flashed, and the hold state is displayed.

Reconnection From Hold To Talking Mode

In the hold state, as explained earlier, when a response occurs and key LK1 is again pushed, a ground potential is applied to control lead H by key telephone set 4. By means of this ground potential, in the same manner as in the case of response by key telephone set 4 during an incoming call as described before, transistor Q105 conducts, transistor A104 is turned off, relay RH releases, and CO line circuit 2 again enters the talking state.

Telephoen Is "Hung Up" From Talking State

In the talking state, when contacts HS1 and HS2 of the hook switch in telephone set 4 are opened simultaneously, the potential of control lead H falls, and since no current flows through photocoupler PHC, transistors Q103 and Q104 do not conduct, and consequently relay RH does not operate. Relay AH releases after a delay central office line circuit 2 goes to a cleared state, and again an idle state is attained with lamp BL1 extinguished.

Release from Hold by the Central Office

Also, if while in the said hold state, the connection to central office line L1 and L2 is cut off by release of the held call through the CO, the current flowing in light emitting diode LED of photocoupler PHC is cut off. Photo-transistor PHT becomes nonconductive, transistors Q103, Q104 and silicon controlled rectifier SCR101 become nonconductive. Once SCR101 becomes nonconducting, since a gate trigger current is not supplied to it, it will not conduct again even if current flow on the CO line resumes, turning on Q103 and Q104. Consequently relay RH releases. When relay RH releases, relay AH also releases because contact rh4 is open, and CO line circuit 2 enters an idle state.

As will be apparent from the explanation of the operation above, by following the present invention, it is possible to exert all the control required over the operation of a central office line of a key telephone system by means of two talking leads and one control lead, for a total of three leads. As compared to the two talking leads, one control lead, one lamp lead, or total of four leads needed for each central office line in prior art key telephone apparatus, the number of leads required can be decreased, and the number of central office lines contained in a key telephone system inter-wired with cable of a standardized number of leads can be increased. A decrease in the number of leads needed for a given number of central office lines available results in economies in cost of manufacture and installation labor.

Further benefits are achieved from the standpoint of appearance. Also, by following the present invention, it is possible to combine the hold detection circuit and the incoming call detection circuit for the key telephone apparatus central office line circuit. By means of this combining of the hold detection circuit and the incoming call detection circuit, it is possible to provide a new means of hold cancellation under control of a central office line, more economically than in prior art key telephone apparatus.

What is claimed is:

1. In a key telephone system comprising, a main apparatus having one central office line circuit for each central office line connected to the main apparatus, said central office lines and central office line circuits being connected together, one set of talking pair leads and a control lead connected to each of said central office line circuits, a plurality of key telephone stations, each of which has means for being electrically connected to two or more sets of talking pair leads and a control lead, each of said key telephone stations having, a plurality of status indicators, each of the indicators corresponding to a particular central office line for which the station has connecting means, hookswitch contacts, switching means for holding the connected central office line.

a source of periodically interrupted first and second signals for periodically enabling and disabling said indicators, improved control circuitry for each central office line comprising, central office line control circuitry associated with said main apparatus and telephone station control circuitry associated with each telephoen station, said central office lin control circuitry and said telephone station control circuitry being interconnected by one control lead associated with each pair of talking leads, said indicators in each telephone station corresponding to the central office lines also being associated with said control leads, said telephone station control circuitry comprising, signal generating means for generating a control signal on said control lead when said telephone station is connected to the corresponding central office line and for removing said control signal on said single control line when said telephone station is placed on hold after having been connected to said central office line, said central office line control circuitry comprising, first detection means for generating a first detection signal only during the presence of (1) an unanswered incoming ringing signal voltage on said central office line, (2) a talking current flow when a key telephone station is conncted to said central office line via said talking lead pair, or (3) a hold condition, second detection means for generating a second detection signal when said control signal appears on said single control line, first circuit means for enabling the application of said first interrupted signal onto said single control lead in order to enable said indicator only if said first detection signal occurs but said second detection signal has not occurred, second circuit means for enabling the application of said second interrupted signal onto said single control lead in order to enable said indicator only if said first detection signal remains after said second detection signal has first occurred and then has been removed, and means responsive to said first and second detection signals for controlling the interconnection of said talking lead pair to said central office lead pair, wherein said first detection means is a photocoupler device comprising a light emitting diode and a photo-transistor, said light emitting diode emitting light in response to signal conditions in said central office line of, (1) alternating current voltage in said central office pair line when an unanswered incoming ringing signal is present (2) direct current during the talking condition on said central office line when the key telephone station is connected to the central office line by means of the corresponding talking leads and, (3) direct current in said central office line when the key telephone station places the line on hold after being in the talking state, said photo-transistor being placed in a conductive state in response to light from said light emitting diode on the occurrence of said signal conditions on said central office line.

2. The control circuitry of claim 1 wherein said first and second interrupted signals applied on said single control lead are signals which alternate between two voltage levels, said control signal on said single control lead generated by said signal generating means in said telephone station control circuitry is a direct-current voltage, and said second detection means is responsive to said direct-current voltage and is not responsive to said first and second interrupted signals.

3. The control circuitry of claim 1 wherein a first relay is placed in an operated state in response to the presence of said first detection signal and the non-occurrence of said second detection signal, or in response to the cessation of said second detection signal while said first detection signal continues.

4. The control circuitry of claim 3 wherein a second relay is placed in an operated state in response to the presence of said second detection signal and is maintained in an operated state after the removal of said second detection signal if said first detection signal continues.

5. The control circuitry of claim 4, wherein said means responsive to said first and second detection signals, for controlling the interconnection of said talking lead pair and said central office line is a first controlled connection comprising, first and second contacts of said second relay, one contact being placed in each conductor of the talking lead pair for directly connecting said talking lead pair to said central office line when said second relay is non-operated, said contacts providing talking circuit continuity in event of failure of power source E, a third contact of said second relay for connecting a direct current blocking capacitor between one conductor of said central office line and one input side of a full wave rectifier circuit when said second relay is non-operated, said capacitor providing an alternating current circuit to the full wave rectifier, a fourth contact of said second relay for connecting said light emitting diode across the output side of said full wave rectifier circuit when said second relay is non-operated, a second controlled connection comprising, said third contact of said second relay directly connecting one lead of said central office line to the input side of said full wave rectifier circuit when said second relay is operated, said first and second contacts of said second relay connecting said talking lead pair to the output side of said full wave rectifier via said light emitting diode when said second relay is operated, said contacts and rectifier providing a talking circuit of constant polarity from the CO line to the station, a third controlled connection comprising, said third contact of said second relay directly connecting one lead of said central office line to the input side of said full wave rectifier circuit when said second relay is operated, a contact of said first relay and said fourth contact of said second relay forming a series circuit connecting said light emitting diode across the output of said full wave rectifier circuit when said first and second relays are operated, said rectifier, contacts and LED providing a holding circuit for the central office connection.

6. The control circuitry of claim 5 wherein said central office connection holding circuit associated with said fourth contact of said second relay and said contact of said first relay is maintained by the continued presence of said first detection signal, said first and second relays being released by the cessation of said first detection signal.

7. The control circuitry of claim 1 wherein said second detection means comprises a current sensing means through which said first and second indicator enabling signals pass in one direction for generating a first output signal and through which said telephone station generated control signal passes in the opposite direction for generating a second output signal.

8. The control circuit of claim 7 wherein said current sensing means comprises
a transistor,
a rectifier diode connected between base emitter junction and poled oppositely to said junction of said transistor,
a bias current source means for supplying base current to said transistor,
wherein said first and second indicator enabling signals are individually applied to the transistor base and diode anode and the telephone station generated control signal is applied to the transistor emitter and diode cathode, producing said first output signal at the collector in response to said indicator enabling signals and said second output signal at the collector in response to said telephone station generated control signal.

* * * * *

UNITED STATES PATENT AND TRADEMARK OFFICE
CERTIFICATE OF CORRECTION

PATENT NO. : 4,081,625
DATED : March 28, 1978
INVENTOR(S) : Fumikazu Hamatani et al It is certified that error appears in the above-identified patent and that said Letters Patent are hereby corrected as shown below:

Col. 1, line 32, correct spelling of "conservation".

Col. 5, line 39, change "this" to --thus--.

Col. 5, line 59, correct spelling of "talking".

Col. 5, line 61, change "is" second occurrence to --in--.

Col. 6, lines 2-3, correct spelling of "detection".

Col. 6, line 15, correct spelling of "telephone".

Col. 6, line 38, change "E101" to --R101--.

Col. 6, line 40, change "R10" to --R102--.

UNITED STATES PATENT AND TRADEMARK OFFICE
CERTIFICATE OF CORRECTION

PATENT NO. : 4,081,625
DATED : March 28, 1978
INVENTOR(S) : Fumikazu Hamatani, et al It is certified that error appears in the above-identified patent and that said Letters Patent are hereby corrected as shown below:

Col. 6, line 56, correct spelling of "contact".

Col. 7, line 33, change "relay" to --delay--.

Col. 7, line 61, correct spelling of "closes".

Col. 8, line 17, change "120" to --R120--.

Col. 8, line 27, change "A105" to --Q105--.

Col. 8, line 34, change "s" to --a--.

Col. 9, line 19, change "delay" to --relay--.

Col. 9, line 23, change "Rf" to --RF--.

Col. 9, line 42, change "Rf" to --RF--.

Col. 10, line 21, correct spelling of "supplied".

Col. 11, line 20, correct spelling of "control".

Col. 11, line 56, change "Scr101" to --SCR101--.

Col. 12, line 33, change "A104" to --Q104--.

Col. 12, line 37, correct spelling of "Telephone".

Col. 13, line 36, change "." to -- , --.

UNITED STATES PATENT AND TRADEMARK OFFICE
CERTIFICATE OF CORRECTION

PATENT NO. : 4,081,625
DATED : March 28, 1978
INVENTOR(S) : Fumikazu Hamatani, et al It is certified that error appears in the above-identified patent and that said Letters Patent are hereby corrected as shown below:

Col. 13, line 44, correct spelling of "telephone".

Col. 13, line 45, correct spelling of "line".

Col. 13, line 65, correct spelling of "connected".

Signed and Sealed this

Fifth Day of September 1978

[SEAL]

Attest:

RUTH C. MASON
*Attesting Officer*

DONALD W. BANNER
*Commissioner of Patents and Trademarks*